(12) United States Patent
McArdle et al.

(10) Patent No.: US 7,069,330 B1
(45) Date of Patent: Jun. 27, 2006

(54) CONTROL OF INTERACTION BETWEEN CLIENT COMPUTER APPLICATIONS AND NETWORK RESOURCES

(75) Inventors: Mark J. McArdle, Conestogo (CA); Brent A. Johnston, Kitchener (CA); Philip D. R. Nathan, Kitchener (CA); James Dool, Kitchener (CA)

(73) Assignee: McAfee, Inc., Santa Clara, CA (US)

( * ) Notice: Subject to any disclaimer, the term of this patent is extended or adjusted under 35 U.S.C. 154(b) by 825 days.

(21) Appl. No.: 09/900,002

(22) Filed: Jul. 5, 2001

(51) Int. Cl.
*G06F 15/16* (2006.01)

(52) U.S. Cl. ............... 709/229; 709/227; 709/223; 709/224; 709/225

(58) Field of Classification Search ............... 709/217, 709/219, 223–225, 229; 713/152, 154, 182, 713/200, 201; 707/104.1, 9, 102; 718/104
See application file for complete search history.

(56) References Cited

U.S. PATENT DOCUMENTS

| | | | | |
|---|---|---|---|---|
| 5,892,900 A | * | 4/1999 | Ginter et al. ............... 713/200 |
| 6,135,646 A | * | 10/2000 | Kahn et al. ................. 709/217 |
| 6,154,775 A | * | 11/2000 | Coss et al. .................. 713/200 |
| 6,499,110 B1 | * | 12/2002 | Moses et al. ............... 713/152 |
| 6,604,143 B1 | * | 8/2003 | Nagar et al. ................ 709/229 |
| 6,647,388 B1 | * | 11/2003 | Numao et al. ................. 707/9 |
| 6,772,347 B1 | * | 8/2004 | Xie et al. .................... 713/154 |
| 6,792,461 B1 | * | 9/2004 | Hericourt .................... 709/225 |

\* cited by examiner

*Primary Examiner*—Jeffrey Pwu
(74) *Attorney, Agent, or Firm*—Zilka-Kotab, PC; Christopher J. Hamaty

(57) ABSTRACT

An application policy engine for a computer blocks access to network resources by applications executing on the computer that are not authorized for such access by an application policy file. The application policy engine monitors outgoing network traffic from the computer and compares an identifier for the application contained in a network access request with application identifiers stored in the application policy file. If the application identifier is associated with an unauthorized application, access to the network is blocked by the application policy engine. In another aspect, an unauthorized application is allowed access to certain resources on a network while being blocked from other resources on the same network. In still a further aspect, an authorized application may be permitted only certain types of access to a network or network resource.

29 Claims, 5 Drawing Sheets

US 7,069,330 B1

CONTROL OF INTERACTION BETWEEN CLIENT COMPUTER APPLICATIONS AND NETWORK RESOURCES

FIELD OF THE INVENTION

This invention relates generally to networked client computers, and more particularly to controlling the interaction between applications on a client computer and resources on the network.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Networks Associates Technology, Inc., All Rights Reserved.

BACKGROUND OF THE INVENTION

A network administrator for an organization faces great challenges in controlling the types of applications that users in the organization deploy on client computers connected into the organization's network environment. Because the running of "unauthorized" software exposes the organization to productivity losses, bandwidth losses, and increased support costs, it would be beneficial be able to prevent some, or all of these problems.

However, it is inherently difficult to prevent users from downloading and installing software on their own computers. The vast majority of client computers on corporate local area networks also have access to the Internet, making it nearly impossible to prevent users from downloading software from a web site on the Internet. While installation of unauthorized software can be prevented through access control rules provided by some operating systems, most corporate client computers run operating systems that do not manage users according to local access control rules and thus it is not possible to prevent the user from installing the unauthorized software on such computers.

SUMMARY OF THE INVENTION

An application policy engine for a computer blocks access to network resources by applications executing on the computer that are not authorized for such access by an application policy file. The application policy engine monitors outgoing network traffic from the computer and compares an identifier for the application contained in a network access request with application identifiers stored in the application policy file. If the application identifier is associated with an unauthorized application, access to the network is blocked by the application policy engine. In another aspect, an unauthorized application is allowed access to certain resources on a network while being blocked from other resources on the same network. In still a further aspect, an authorized application may be permitted only certain types of access to a network or network resource.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1A:
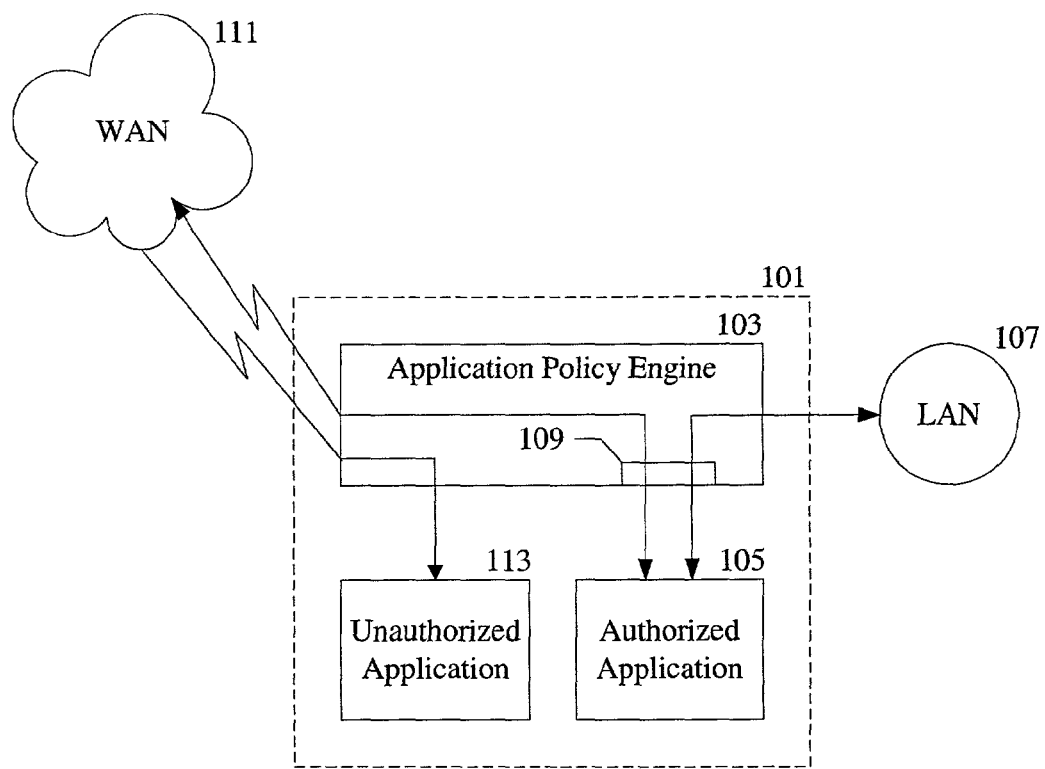
FIGS. 1A and 1B are diagrams illustrating a system-level overview of an embodiment of the invention.
Figure 1B:
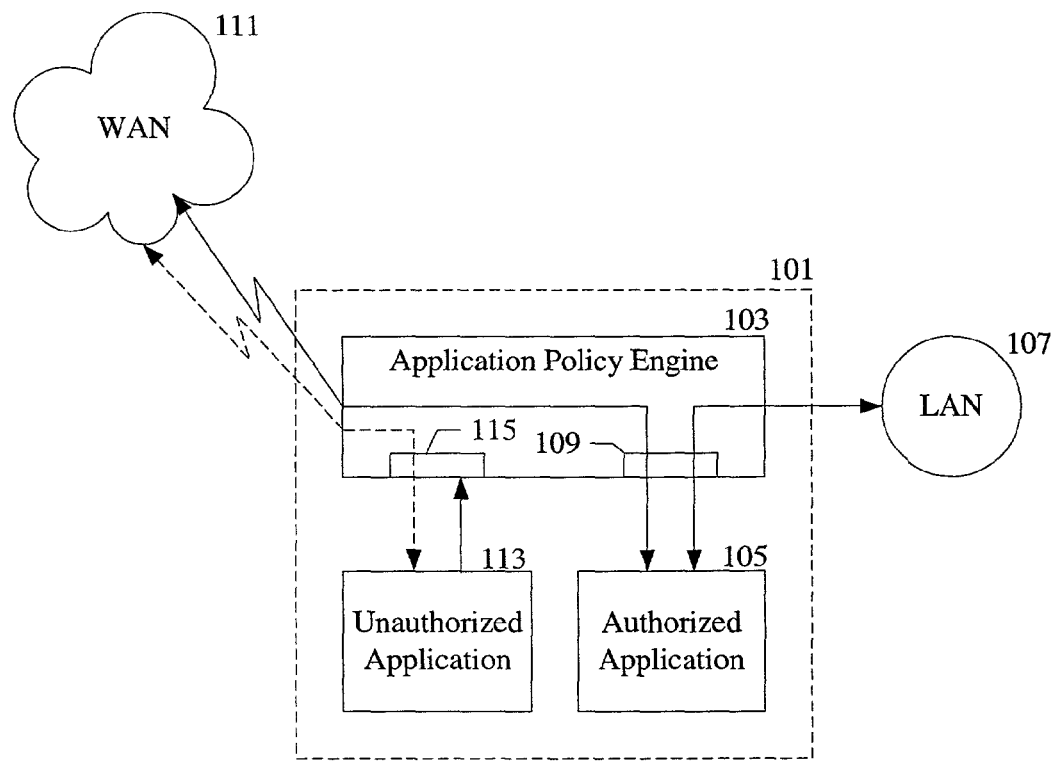

A system level overview of the operation of an embodiment of the invention is described by reference to FIGS. 1A and 1B. As shown in FIG. 1A, an application policy engine 103 installed in a client computer 101 controls access to network resources on a local area network (LAN) 107, such as a private corporate network, by monitoring outgoing network traffic from the client computer 101. As is common in network environments, each application executing on the client computer 101 is assigned a source address, such as a TCP port number when the underlying network protocol is TCP/IP, that acts as application identifier. Alternatively, the application may be identified by its filename, which may include its fully qualified path on the network. An application policy file (not shown) contains the identifiers of applications that are classified as authorized, or unauthorized, for access to network resources on the LAN 107. When an application, such as authorized application 105 with identifier 109, requests access to a LAN 107 network resource, the application policy engine 103 searches the application policy file, determines the identifier 109 is associated with an authorized application, and allows the authorized application 105 access to the network resource. Furthermore, an application may be unauthorized for certain types of network access but authorized for others depending on the presence of various network restrictions in the application policy file.

The client computer 101 may also connect to a public wide area network (WAN) 111, such as the Internet. In one embodiment, the application policy engine 103 allows all applications access to the WAN 111. In an alternate embodiment, only authorized applications are allowed access to the WAN 111. In either embodiment, because the application policy engine 103 monitors outgoing network traffic, it does not prevent the authorized application 105 from downloading other, possibly unauthorized, applications for installation on the client computer 101.

Once installed, an unauthorized application 113 is assigned an application identifier 115 and may access resources local to the client computer 101. However, as shown in FIG. 1B, the application policy engine 103 blocks access by the unauthorized application 113 to LAN 107 resources because the application identifier 115 is not associated with an authorized application. In the embodiment in which the application policy engine 103 allows all access to the WAN 111, the unauthorized application 113 can access resources on the WAN 111 as shown in phantom. In the alternate embodiment in which only authorized applications are allowed access to the WAN 111, the application policy engine 103 also blocks access by the unauthorized application 113 to the WAN 111.

Thus, the application policy engine of the present invention allows the user of a client computer to install unauthorized software but reduces the amount of bandwidth and drain on network resources by preventing such unauthorized software from accessing some or all of the network resources.

While only two networks have been used to illustrate the operation of the invention, the application policy engine 103 is suitable for use in network environments in which the client computer is connected to more than one LAN and/or more than one WAN. Moreover, the various network may operate under disparate protocols, with the application policy file holding different identifiers for the same application to correspond to the different network addresses assigned to the application. Furthermore, it will be appreciated that the policy file may be configured to allow an unauthorized application access to certain network resources while blocking its access to others, instead of blocking all access.

Figure 2:
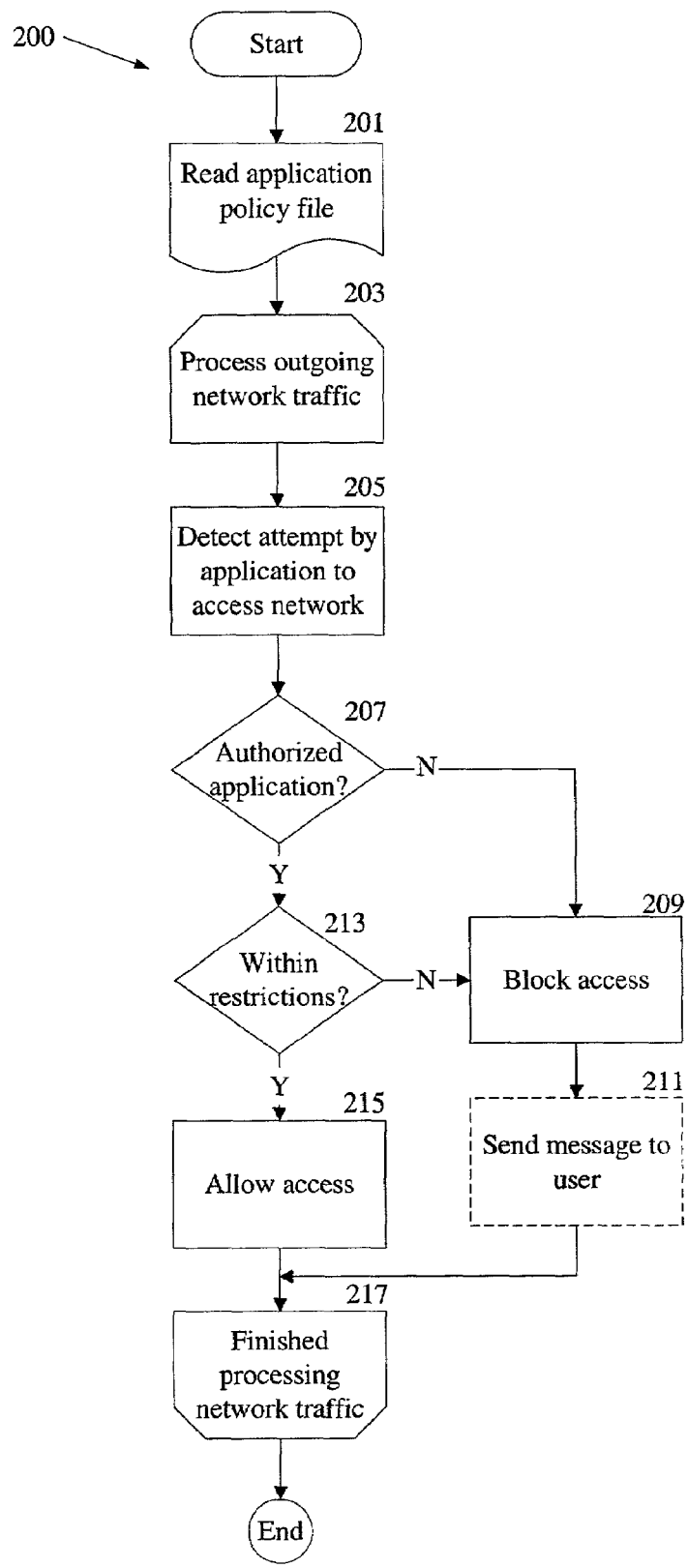
FIG. 2 is a flowchart of a method to be performed by a client computer according to an embodiment of the invention.

Next, a particular embodiment of an application policy method 200 to be performed by the client computer 101 is described in terms of computer software with reference to a flowchart or flow diagram in FIG. 2. The method 200 constitutes computer programs made up of computer-executable instructions illustrated as blocks (acts) from 201 until 217. Describing the method by reference to a flowchart enables one skilled in the art to develop such programs including such instructions to carry out the method on suitably configured computers (the processing unit of the computer executing the instructions from computer-readable media). The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application, module, logic . . . ), as taking an action or causing a result. Such expressions are merely a shorthand way of saying that execution of the software by a computer causes the processor of the computer to perform an action or a produce a result. It will be appreciated that more or fewer processes may be incorporated into the method illustrated in FIG. 2 without departing from the scope of the invention and that no particular order is implied by the arrangement of blocks shown and described herein.

The application policy method 200 is invoked when the client computer 101 is initialized or when the client computer 101 first connects to a network. The method 200 may operate as a stand-alone application firewall engine as described above in conjunction with FIGS. 1A and 1B, or it may operate within a standard firewall engine as an optional feature. The method 200 reads the current application policy file (block 201) and begins monitoring the outgoing traffic from the client computer 101 (block 203). When the method 200 detects an attempt by an application to access a network (block 205), it examines the application policy file to determine if the application is authorized to access that particular network (block 207). If not, the access is blocked (block 209) and an optional error message is sent to the user (block 211). If the application is authorized, the method 200 determines if the attempted access is within any network restrictions specified in the application policy file for the application (block 213). If there are no restrictions for the particular network, or if the attempted access is within the restrictions, the access is allowed (block 215). Otherwise, if the access is not within the specified restrictions, access is blocked at block 209. The method 200 continues monitoring outgoing network traffic until the client computer 101 disconnects from the last network or when the computer is shut down (block 217). Although not shown in FIG. 2, it will be appreciated that the method 200 re-reads the application policy file when the file changes and re-evaluates currently executing applications against the changed file.

Figure 3:
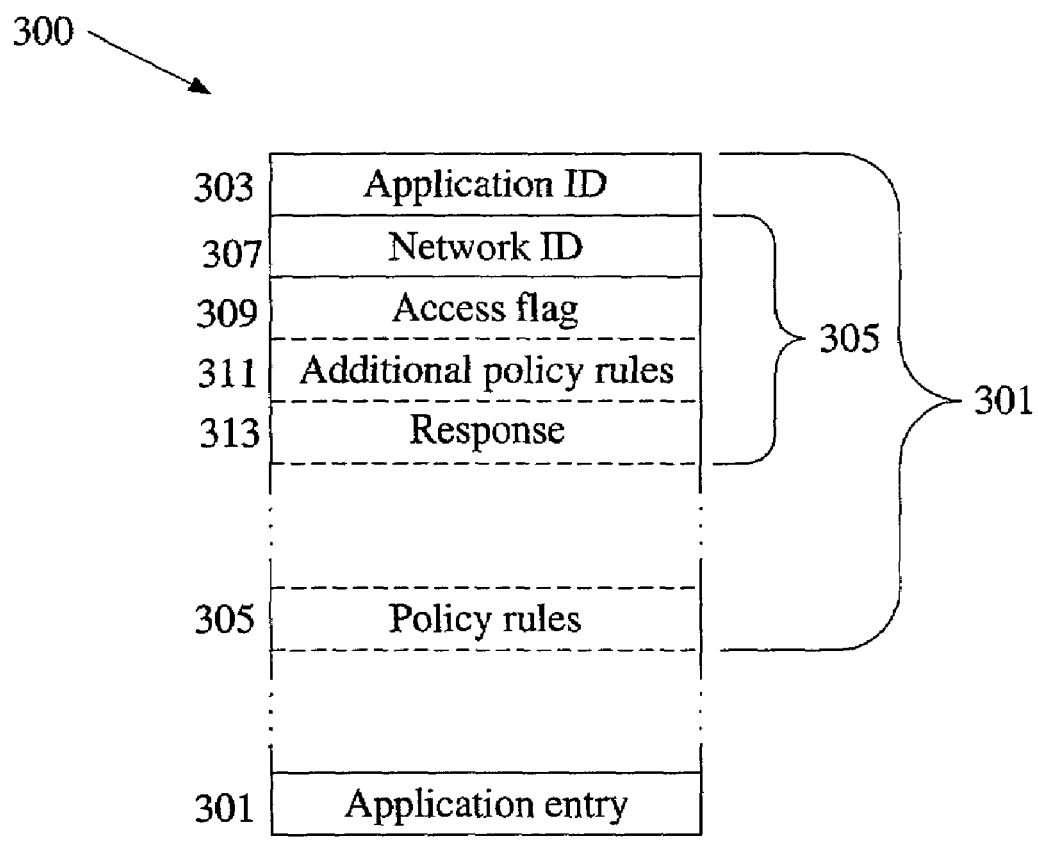
FIG. 3 is a diagram of an application policy data structure for use in one embodiment of the invention.

Turning now to FIG. 3, an exemplary embodiment of an application policy data structure 300 is described that permits various granularities of access to networks and network resources by applications. The application policy data structure 300 contains a set of application entries 301, each identified by an application identifier 303. Each entry 301 includes a set of access policy rules 305 for a particular network or network resource that is identified by a network identifier 307. One of skill in the art will immediately understand that the network identifier 307 contains data, such as network address ranges, that uniquely identifies a network, or data that uniquely identifies a resource within a particular network by, for example, its network address or its UNC (Universal Naming Convention) path. An access flag 309 in the access policy rules 305 for a particular network identifier 307 specifies whether access to the corresponding network or resource is allowed, or disallowed. Optional additional policy rules 311 that control certain types of network access, such as allowing/disallowing the use of particular ports and/or protocols, allowing/disallowing inbound and/or outbound network traffic, and placing time restrictions on access, may also be present for a particular network identifier 307. When the additional policy rules 311 are present, a finer granularity of access can be achieved by combining the rules 311, such as "allow DNS service from the specified particular network server" or "disallow FTP to or from these specified addresses." An optional response field 313 specifies an action to take if the application attempts access that is not allowed by the access policy rules 305. Such actions include logging the attempt, alerting the user and/or network administrator, or treating the attempt as an intrusion into the network.

It will be appreciated that a null setting for the network flag 309 may be interpreted as either allowing or disallowing all access to the network/resource specified by the identifier 307 and that no additional policy rules 311 would be necessary in that instance. Furthermore, it will be appreciated that if the optional response field 313 is not present, a default action may be taken.

Figure 4A:
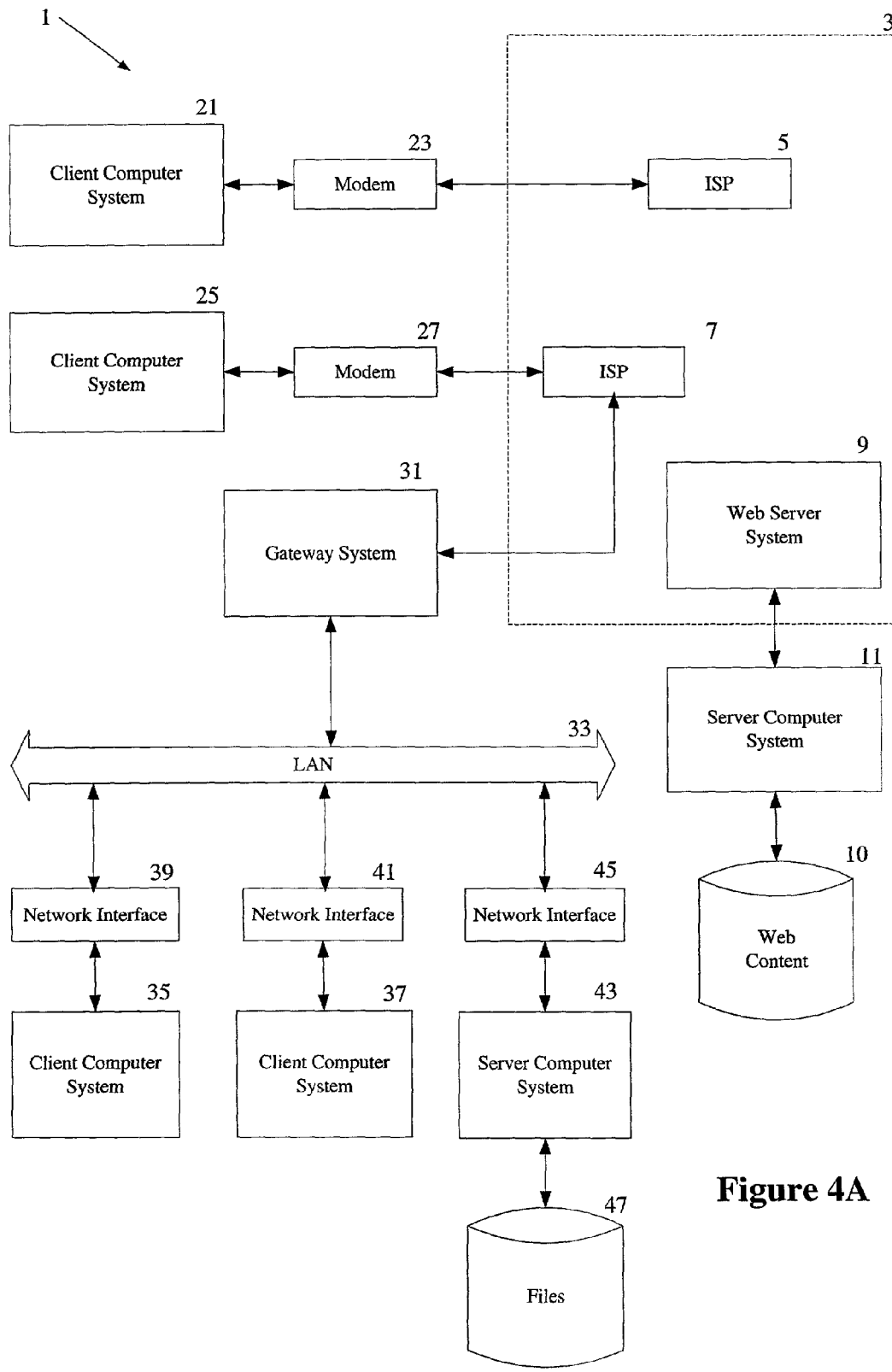
FIG. 4A is a diagram of one embodiment of an operating environment suitable for practicing the present invention.
Figure 4B:
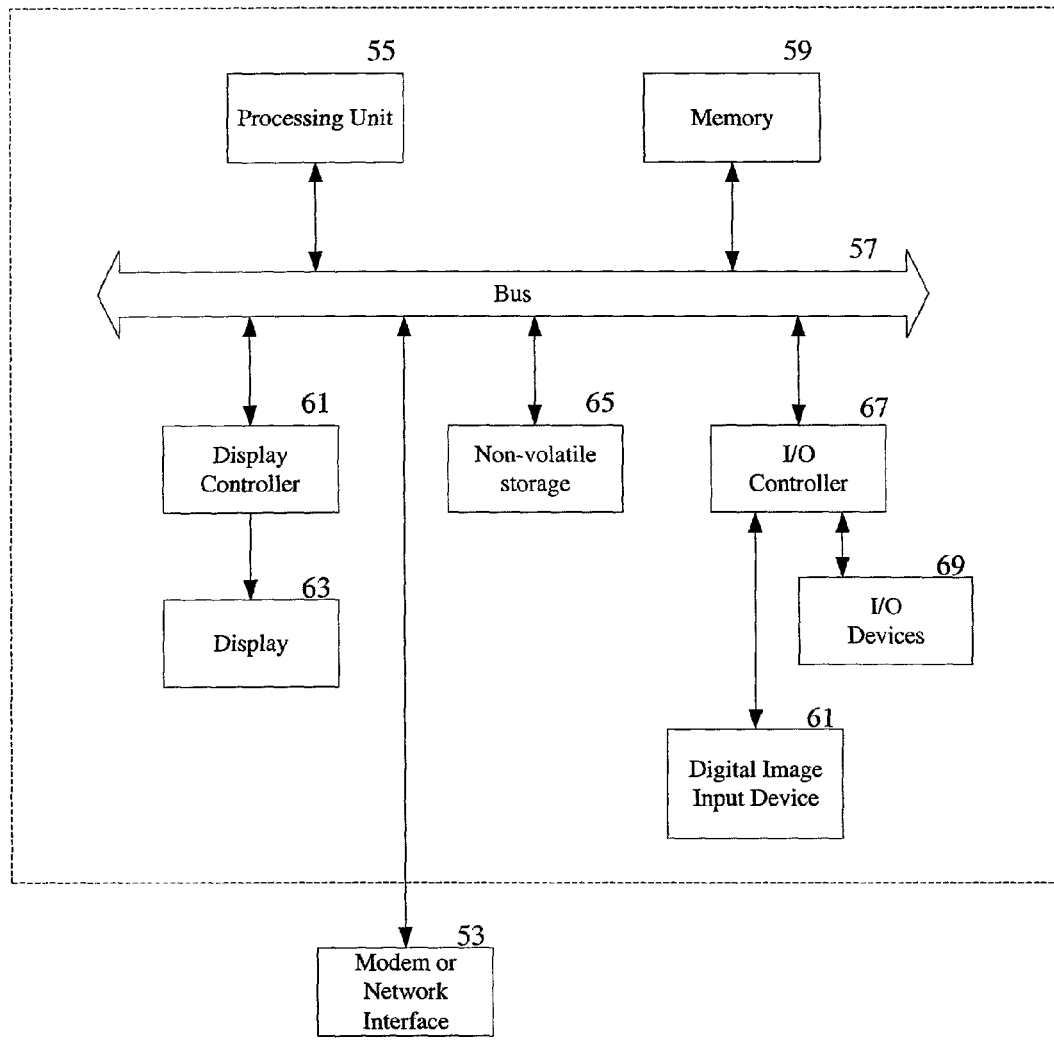
FIG. 4B is a diagram of one embodiment of a computer system suitable for use in the operating environment of FIG. 4A.

The following description of FIGS. 4A–B is intended to provide an overview of computer hardware and other operating components suitable for performing the methods of the invention described above, but is not intended to limit the applicable environments. One of skill in the art will immediately appreciate that the invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 4A shows several computer systems that are coupled together through a network 3, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (web). The physical connections of the Internet and the protocols and communication procedures of the Internet are well known to those of skill in the art. Access to the Internet 3 is typically provided by Internet service providers (ISP), such as the ISPs 5 and 7, through either physical or wireless interfaces. Users on client systems, such as client computer systems 21, 25, 35, and 37 obtain access to the Internet through the Internet service providers, such as ISPs 5 and 7. Access to the Internet allows users of the client computer systems to exchange information, receive and send e-mails, and view documents, such as documents that have been prepared in the HTML format. These documents are often provided by web servers, such as web server 9 that is considered to be "on" the Internet. Often these web servers are provided by the ISPs, such as ISP 5, although a computer system can be set up and connected to the Internet without that system being also an ISP as is well known in the art.

The web server 9 is typically at least one computer system that operates as a server computer system and is configured to operate with the protocols of the World Wide Web and is coupled to the Internet. Optionally, the web server 9 can be part of an ISP that provides access to the Internet for client systems. The web server 9 is shown coupled to the server computer system 11 that itself is coupled to web content 10, which can be considered a form of a media database. It will be appreciated that while two computer systems 9 and 11 are shown in FIG. 4A, the web server system 9 and the server computer system 11 can be one computer system having different software components providing the web server functionality and the server functionality provided by the server computer system 11, which will be described further below.

Client computer systems 21, 25, 35, and 37 can each, with the appropriate web browsing software, view HTML pages provided by the web server 9. The ISP 5 provides Internet connectivity to the client computer system 21 through the modem interface 23 that can be considered part of the client computer system 21. The client computer system can be a personal computer system, a network computer, a Web TV system, a handheld wireless device, or other such computer system. Similarly, the ISP 7 provides Internet connectivity for client systems 25, 35, and 37, although as shown in FIG. 4A, the connections are not the same for these three computer systems. Client computer system 25 is coupled through a modem interface 27 while client computer systems 35 and 37 are part of a LAN. While FIG. 4A shows the interfaces 23 and 27 as generically as a "modem," it will be appreciated that each of these interfaces can be an analog modem, ISDN modem, cable modem, satellite transmission interface (e.g. "Direct PC"), radio frequency (RF), cellular, or other interfaces for coupling a computer system to other computer systems. Client computer systems 35 and 37 are coupled to a LAN 33 through network interfaces 39 and 41, which can be Ethernet network or other network interfaces. The LAN 33 is also coupled to a gateway computer system 31 that can provide firewall and other Internet related services for the local area network. This gateway computer system 31 is coupled to the ISP 7 to provide Internet connectivity to the client computer systems 35 and 37. The gateway computer system 31 can be a conventional server computer system. Also, the web server system 9 can be a conventional server computer system.

Alternatively, as is well-known, a server computer system 43 can be directly coupled to the LAN 33 through a network interface 45 to provide files 47 and other services to the clients 35, 37, without the need to connect to the Internet through the gateway system 31.

FIG. 4B shows one example of a conventional computer system that can be used as a client computer system or a server computer system or as a web server system. It will also be appreciated that such a computer system can be used to perform many of the functions of an Internet service provider, such as ISP 5. The computer system 51 interfaces to external systems through the modem or network interface 53. It will be appreciated that the modem or network interface 53 can be considered to be part of the computer system 51. This interface 53 can be an analog modem, ISDN modem, cable modem, token ring interface, satellite transmission interface (e.g. "Direct PC"), radio frequency (RF), cellular, or other interfaces for coupling a computer system to other computer systems. The computer system 51 includes a processing unit 55, which can be a conventional microprocessor such as an Intel Pentium microprocessor or Motorola Power PC microprocessor. Memory 59 is coupled to the processor 55 by a bus 57. Memory 59 can be dynamic random access memory (DRAM) and can also include static RAM (SRAM). The bus 57 couples the processor 55 to the memory 59 and also to non-volatile storage 65 and to display controller 61 and to the input/output (I/O) controller 67. The display controller 61 controls in the conventional manner a display on a display device 63, which can be a cathode ray tube (CRT) or liquid crystal display. The input/output devices 69 can include a keyboard, disk drives, printers, a scanner, and other input and output devices, including a mouse or other pointing device. The display controller 61 and the I/O controller 67 can be implemented with conventional well known technology. A digital image input device 61 can be a digital camera that is coupled to an I/O controller 67 in order to allow images from the digital camera to be input into the computer system 51. The non-volatile storage 65 is often a magnetic hard disk, an optical disk, or another form of storage for large amounts of data. Some of this data is often written, by a direct memory access process, into memory 59 during execution of software in the computer system 51. One of skill in the art will immediately recognize that the term "computer-readable medium" includes any type of storage device that is accessible by the processor 55 and also encompasses a carrier wave that encodes a data signal.

It will be appreciated that the computer system 51 is one example of many possible computer systems that have different architectures. For example, personal computers based on an Intel microprocessor often have multiple buses, one of which can be an input/output (I/O) bus for the peripherals and one that directly connects the processor 55 and the memory 59 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 59 for execution by the processor 55. A Web TV system, which is known in the art, is also considered to be a computer system according to the present invention, but it may lack some of the features shown in FIG. 4B, such as certain input or output devices. A typical computer system will usually include at least a processor, memory, and a bus coupling the memory to the processor.

It will also be appreciated that the computer system 51 is controlled by operating system software that includes a file management system, such as a disk operating system, which is part of the operating system software. One example of an operating system software with its associated file management system software is the family of operating systems known as Windows® from Microsoft Corporation of Redmond, Wash., and their associated file management systems. The file management system is typically stored in the non-volatile storage 65 and causes the processor 55 to execute the various acts required by the operating system to input and output data and to store data in memory, including storing files on the non-volatile storage 65.

An application policy engine has been described that restricts access by unauthorized applications to some or all network resources. Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. For example, those of ordinary skill in the art will appreciate that while the invention as been described as an application policy software executing on the processing unit of the computer the application policy engine is protecting, the present invention is equally applicable to application policy software executing on a processing unit for a hardware firewall that provides the features of the application policy engine.

The terminology used in this application with respect to networks is meant to include all of network environments, wired and wireless, wide area and local area, public and private. Therefore, it is manifestly intended that this invention be limited only by the following claims and equivalents thereof.

What is claimed is:

1. A computerized method for restricting network access by applications comprising:
   detecting a network access request from an application;
   examining an application policy file to determine if the application is authorized to access the network by comparing an identifier for the application with identifiers in the application policy file that correspond to applications authorized for installation on computers coupled to the network; and
   blocking access to the network if the application is not authorized to access the network.

2. The method of claim 1 further comprising:
   determining a network resource requested by the application;
   examining the application policy file to determine if the application is authorized to access the network resource; and
   allowing access to the network resource if the application is authorized to access the network resource.

3. The method of claim 1 further comprising:
   determining a type of network access requested by the application;
   examining the application policy file to determine if the application is authorized for the type of network access requested; and
   allowing the type of network access requested if the application is authorized for the type of network access requested.

4. The method of claim 1 further comprising:
   updating the application policy file; and
   re-evaluating applications currently executing against the updated policy file.

5. The method of claim 1, wherein the application identifier is in the network access request.

6. The method of claim 1, wherein the method is performed on a client computer on which the application is executing.

7. A computer-readable medium having executable instruction to cause a computer to perform a method comprising:
   detecting a network access request from an application;
   examining an application policy file to determine if the application is authorized to access the network by comparing an identifier for the application with identifiers in the application policy file that correspond to applications authorized for installation on computers coupled to the network; and
   blocking access to the network if the application is not authorized to access the network.

8. The computer-readable medium of claim 7, wherein the method further comprises:
   determining a network resource requested by the application;
   examining the application policy file to determine if the application is authorized to access the network resource; and
   allowing access to the network resource if the application is authorized to access the network resource.

9. The computer-readable medium of claim 7, wherein the method further comprises:
   determining a type of network access requested by the application;
   examining the application policy file to determine if the application is authorized for the type of network access requested; and
   allowing the type of network access requested if the application is authorized for the type of network access requested.

10. The computer-readable medium of claim 7, wherein the method further comprises:
    updating the application policy file; and
    re-evaluating applications currently executing against the updated policy file.

11. The computer-readable medium of claim 7, wherein the application identifier is in the network access request.

12. A computer system comprising:
a processing unit;
a memory coupled to the processing unit through a bus;
a network interface coupled to the processing unit through the bus and further operable for coupling to a network; and
an application policy process executed from the memory by the processing unit to cause the processing unit to detect a network access request from an application, to examine an application policy file to determine if the application is authorized to access the network by comparing an identifier for the application with identifiers in the application policy file that correspond to applications authorized for installation on computers coupled to the network, and to block access to the network if the application is not authorized to access the network.

13. The computer system of claim 12, wherein the application policy process further causes the processing unit to determine a network resource requested by the application, to examine the application policy file to determine if the application is authorized to access the network resource, and to allow access to the network resource if the application is authorized to access the network resource.

14. The computer system of claim 12, wherein the application policy process further causes the processing unit to determine a type of network access requested by the application, to examine the application policy file to determine if the application is authorized for the type of network access requested, and to allow the type of network access requested if the application is authorized for the type of network access requested.

15. The computer system of claim 12, wherein the application policy process further causes the processing unit to update the application policy file, and to re-evaluate applications currently executing against the updated policy file.

16. The computer system of claim 12, wherein the application identifier is in the network access request.

17. The computer system of claim 12, wherein the application is executed from the memory by the processing unit.

18. A computer-readable medium having stored thereon an application policy data structure comprising:
an application identifier field containing data identifying an application that is authorized for installation on computer coupled to a network;
a network identifier field containing data identifying a entity that is accessible by the application identified by the application identifier field; and
an access flag field containing data specifying whether the application identified by the application identifier field is allowed access to the entity identified by the network identifier field.

19. The computer-readable medium of claim 18 further comprising:
an additional policy rule field containing data specifying whether the application identified by the application identifier field is allowed a particular type of access to the entity identified by the network identifier field.

20. The computer-readable medium of claim 18 further comprising:
a response field containing data specifying an action to performed if the application identified by the application identifier field attempts access to the entity identified by the network identifier field and the access is not allowed.

21. The computer-readable medium of claim 18, wherein the entity is selected from the group consisting of a network and a network resource.

22. The method of claim 5, wherein the application identifier is selected from the group consisting of a file name of the application and a path on the network.

23. The method of claim 5, wherein a plurality of the application identifiers are associated with each application, and each of the application identifiers corresponds to a different network address assigned to the corresponding application.

24. The method of claim 1, wherein each application entry in the application policy file comprises a set of access policy rules for one of a network and a network resource identified by a network identifier.

25. The method of claim 24, wherein the network identifier is selected from the group consisting of a network address range and a Universal Naming Convention path.

26. The method of claim 24, wherein the set of access policy rules includes a first rule that allows a DNS service from a specified network server, and a second rule that disallows FTP with respect to specified addresses.

27. The method of claim 26, wherein a null setting for an access flag is interpreted as one of allowing and disallowing all access to a network specified by the network identifier.

28. The method of claim 1 wherein the application policy file includes an application identifier, a network identifier, an access flag, additional policy rules, and at least one application entry.

29. A computerized method for execution on a computer coupled to a network to restrict network access by an application executing on the computer, the method comprising:
detecting a network request from the application, the request comprising at least one of an identifier and entity and a type of network access, wherein the entity is one of a network and a network resource;
examining an application policy file to determine if the application is authorized to access the entity by comparing an identifier for the application with identifiers in the application policy file that correspond to applications authorized for installation on computers coupled to the network, wherein each application entry in the application policy file comprises a set of access policy rules for a network corresponding to a network identifier, the network identifier comprising at least one of a network address range and a Universal Naming Convention path, and wherein the application policy file further comprises an access flag having a null setting that is interpreted as one of allowing and disallowing all access to a network specified by the network identifier;
blocking access to the entity if the application is not authorized to access the entity, and
re-evaluating applications currently executing against any updated application policy file,
wherein a plurality of the application identifiers are associated with each application, each application identifier corresponding to a different network address assigned to the corresponding application, and wherein each application identifier is one of a file name of the application and a path on the network.

* * * * *

UNITED STATES PATENT AND TRADEMARK OFFICE
CERTIFICATE OF CORRECTION

PATENT NO. : 7,069,330 B1  Page 1 of 1
APPLICATION NO. : 09/900002
DATED : June 27, 2006
INVENTOR(S) : McArdle et al.

It is certified that error appears in the above-identified patent and that said Letters Patent is hereby corrected as shown below:

In the claims:
col. 8, line 29 replace "computer-readable medium" with --storage media--;
col. 8, line 41 replace "computer-readable medium" with --storage media--;
col. 8, line 50 replace "computer-readable medium" with --storage media--;
col. 8, line 60 replace "computer-readable medium" with --storage media--;
col. 8, line 65 replace "computer-readable medium" with --storage media--;
col. 9, line 41 replace "computer-readable medium" with --storage media--;
col. 9, line 53 replace "computer-readable medium" with --storage media--;
col. 9, line 59 replace "computer-readable medium" with --storage media--;
col. 10, line 1 replace "computer-readable medium" with --storage media--;
col. 10, line 4 replace "method" with --storage media--;
col. 10, line 20 delete "a" before "DNS" and after "allows";
col. 10, line 54 replace "entity," with --entity;--.

Signed and Sealed this

Sixteenth Day of February, 2010

David J. Kappos
*Director of the United States Patent and Trademark Office*